US011216279B2

(12) United States Patent
Jarvis et al.

(10) Patent No.: US 11,216,279 B2
(45) Date of Patent: Jan. 4, 2022

(54) LOOP EXIT PREDICTOR

(71) Applicant: ADVANCED MICRO DEVICES, INC., Santa Clara, CA (US)

(72) Inventors: Anthony Jarvis, Boxborough, MA (US); Thomas Clouqueur, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/200,491

(22) Filed: Nov. 26, 2018

(65) Prior Publication Data

US 2020/0167164 A1  May 28, 2020

(51) Int. Cl.
  *G06F 9/38* (2018.01)
  *G06F 9/30* (2018.01)
  *G06F 9/32* (2018.01)

(52) U.S. Cl.
  CPC ........ *G06F 9/3848* (2013.01); *G06F 9/30065* (2013.01); *G06F 9/325* (2013.01)

(58) Field of Classification Search
  None
  See application file for complete search history.

(56) References Cited

U.S. PATENT DOCUMENTS

| | | | | |
|---|---|---|---|---|
| 6,014,741 | A * | 1/2000 | Mahalingaiah | G06F 9/3017 712/231 |
| 7,533,252 | B2 * | 5/2009 | Davis | G06F 9/3806 712/239 |
| 2005/0138341 | A1 * | 6/2005 | Maiyuran | G06F 9/325 712/241 |
| 2007/0061554 | A1 * | 3/2007 | Worrell | G06F 9/3846 712/239 |
| 2007/0220239 | A1 * | 9/2007 | Dieffenderfer | G06F 9/3848 712/240 |
| 2009/0150657 | A1 * | 6/2009 | Gschwind | G06F 9/3802 712/239 |
| 2009/0150658 | A1 * | 6/2009 | Mizumo | G06F 9/30065 712/241 |
| 2012/0124345 | A1 * | 5/2012 | Denman | G06F 9/3844 712/237 |
| 2013/0311760 | A1 * | 11/2013 | Kothari | G06F 9/3806 712/240 |

(Continued)

OTHER PUBLICATIONS

Sherwood, Timothy, et al., "Loop Termination Prediction", Proceedings of the 3rd International Symposium on High Performance Computing, Oct. 2000, 14 pages.

(Continued)

*Primary Examiner* — Eric Coleman

(57) ABSTRACT

A processor includes a prediction engine coupled to a training engine. The prediction engine includes a loop exit predictor. The training engine includes a loop exit branch monitor coupled to a loop detector. Based on at least one of a plurality of call return levels, the loop detector of the processor takes a snapshot of a retired predicted block during a first retirement time, compares the snapshot to a subsequent retired predicted block at a second retirement time, and based on the comparison, identifies a loop and loop exit branches within the loop for use by the loop exit branch monitor and the loop exit predictor to determine whether to override a general purpose conditional prediction.

20 Claims, 5 Drawing Sheets

(56) References Cited

U.S. PATENT DOCUMENTS

| 2015/0046690 A1* | 2/2015 | Eickemeyer | G06F 9/3844 |
| | | | 712/239 |
| 2015/0227374 A1* | 8/2015 | Blasco | G06F 9/3806 |
| | | | 712/240 |
| 2015/0293577 A1 | 10/2015 | Hall et al. | |
| 2017/0003968 A1 | 1/2017 | Adiga et al. | |

OTHER PUBLICATIONS

International Search Report and Written Opinion dated Oct. 14, 2019 for International Application No. PCT/US2019/038965, 10 pages.

International Report on Patentability dated Jun. 10, 2021 for Application No. PCT/US2019/038965, 7 Pages.

* cited by examiner

LOOP EXIT PREDICTOR

BACKGROUND

Branch prediction is a technique used by pipeline processing processors to speculatively execute instructions. Branch prediction attempts to determine the appropriate path a branch should take by assessing the likelihood a branch is taken or not taken by the processor. When the branch predictor correctly predicts the path to be taken, branch prediction improves instruction pipeline flow. However, when the branch predictor incorrectly predicts the path (branch misprediction), the result is a waste of processor time and resources as the processor discards the speculatively executed or partially executed instructions.

Typical branch prediction techniques utilize generic conditional predictors for branch prediction. These generic conditional predictors use an associated confidence level to generate the branch prediction. However, when the confidence level is unreliable, the branch predictor can generate branch predictions that have an increased misprediction rate. The increased misprediction rate can lead to a waste of power and resources in the overall processing system. Thus, an improved branch prediction technique that improves the branch misprediction rate is desirable.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Branch misprediction during speculative execution causes wasted work and undue delay in pipeline processing. When predictions are made incorrectly, the prediction pipeline generally requires flushing which results in an associated performance penalty. In addition, a branch misprediction is known to waste power due to, for example, processing instructions following an incorrectly predicted branch. Processing bandwidth is also wasted during branch misprediction when a core is running in multi-thread mode in which pipeline and other resources are shared. To reduce the amount of wasted work in order to save power and improve single-thread and multi-thread performance, FIGS. 1-5 illustrate processing systems and methods for performing loop exit prediction. Loop exit prediction is a technique used to override a conditional branch prediction with a loop exit prediction that results in an improved branch prediction accuracy and a reduction in branch misprediction.

Figure 1:
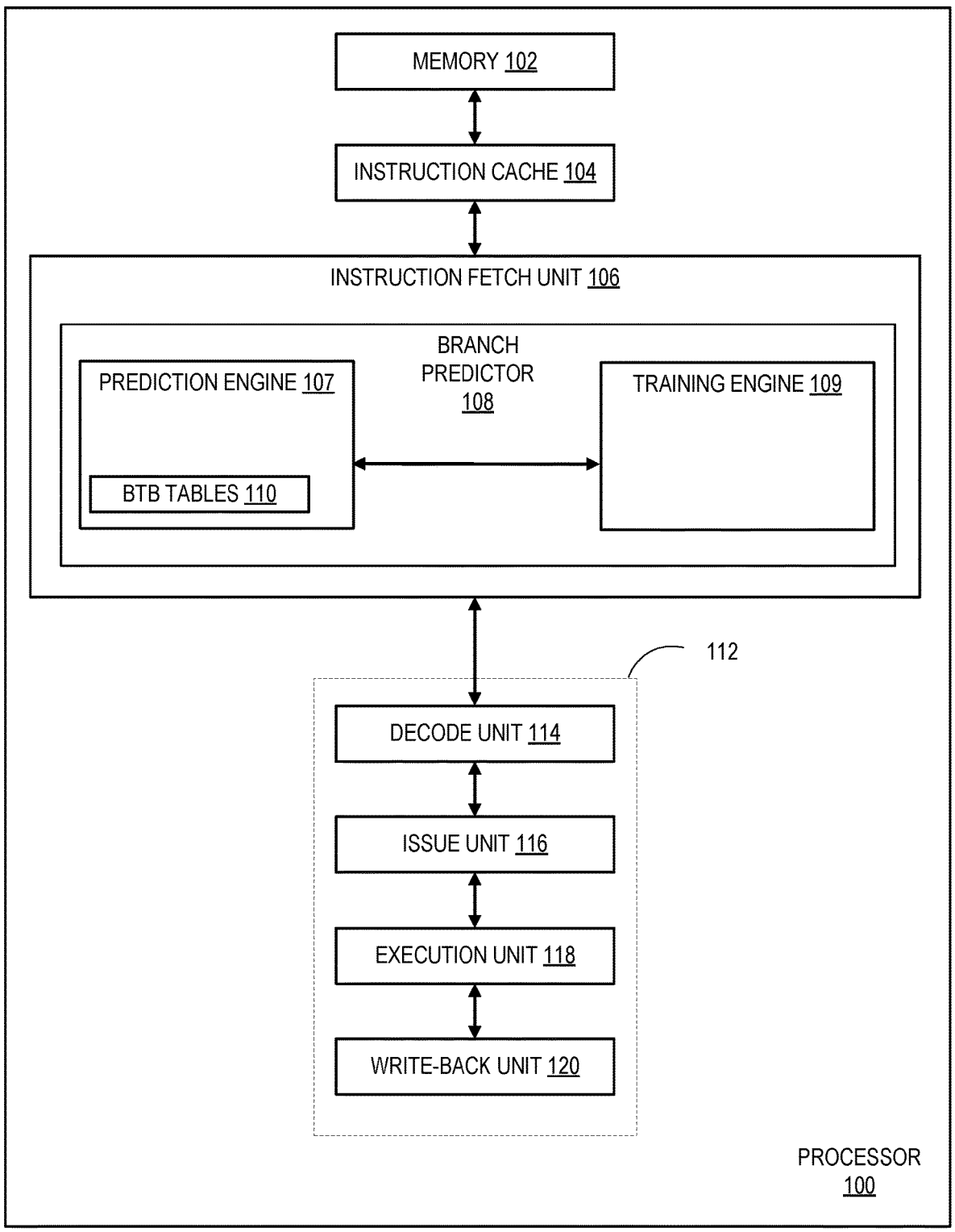
FIG. 1 is a block diagram of a processor including a loop exit predictor to support branch prediction in accordance with some embodiments.

FIG. 1 illustrates a block diagram of a processor 100 implementing loop exit prediction in accordance with various embodiments. Processor 100 includes a memory 102, an instruction cache 104, an instruction fetch unit 106, and a processing pipeline 112. Instruction fetch unit 106 includes a branch predictor 108. Branch predictor 108 includes a training engine 109 coupled to a prediction engine 107, which includes one or more branch target buffer (BTB) tables 110. Processing pipeline 112 includes a decode unit 114, an issue unit 116, an execution unit 118, and a write-back unit 120. In various embodiments, the processing system is included within a computer processor or otherwise distributed within a computer system. Memory 102 includes any type of volatile or nonvolatile memory, such as cache memory, for storing instructions and data. Instruction cache 104 accesses instructions from memory 102 and stores the instructions to be fetched. In various embodiments, memory 102 and instruction cache 104 include multiple cache levels. Further, processor 100 also includes a data cache (not shown).

In FIG. 1, simplified examples of instruction fetch unit 106 and processing pipeline 112 are depicted for ease of illustration. In various embodiments, instruction fetch unit 106 and/or branch predictor 108 is part of processing pipeline 112. Processing pipeline 112 can also include other features, such as error checking and handling logic, one or more parallel paths through processing pipeline 112, and other features known in the art. While a forward path through processing pipeline 112 is depicted in FIG. 1, other feedback and signaling paths may be included between elements of processor 100.

In various embodiments, during operation of processor 100, instruction fetch unit 106 fetches instructions from instruction cache 104 for further processing by decode unit 114. In one embodiment, instruction fetch unit 106 includes branch predictor 108 and also includes other branch prediction logic (not shown). Alternatively, in other embodiments, branch predictor 108 is located separately from the instruction fetch unit 106. Branch predictor 108 is an example of a processing circuit to implement branch prediction using loop exit prediction as discussed in more detail below.

Decode unit 114 decodes instructions and passes the decoded instructions, portions of instructions, or other decoded data to issue unit 116. Issue unit 116 analyzes the instructions or other data and transmits the decoded instructions, portions of instructions, or other data to one or more execution units 118 based on the analysis. The one or more execution units 118 include execution units such as fixed-point execution units, floating-point execution units, load/store execution units, vector execution units, and the like for executing the instructions. Write-back unit 120 writes results of instruction execution back to a destination resource (not shown). The destination resource may be any type of resource, including registers, cache memory, other memory, I/O circuitry to communicate with other devices, other processing circuits, or any other type of destination for executed instructions or data.

During retirement time of processor 100, training engine 109 receives retired predicted blocks from processing pipeline 112. Each retired predicted block describes a set of instruction bytes that were predicted together and that have retired. Training engine 109 is the training portion of branch predictor 108 that, based on an assessment of loops within an instruction stream using the retired predicted block/s and the subsequent retired predicted block, identifies branches that cause loops to exit and provides information to be used to predict the direction of such branches to prediction engine 107. Prediction engine 107 is the portion of branch predictor 108 that utilizes the loop exit branch information provided by training engine 109 to generate a loop exit prediction that is used as the branch prediction output of branch predictor 108. In various embodiments, whether the loop exit prediction is utilized as the output of branch predictor 108 is based on a confidence level threshold and/or the confidence levels provided by the training engine 109. In order for branch predictor 108 to utilize loop exit prediction for improved branch prediction operations, branch predictor 108 uses training engine 109 and prediction engine 107 in tandem to provide an override mechanism for general purpose conditional predictions that are generated by a general purpose conditional predictor. A general purpose conditional predictor is a conditional predictor that ascertains a branch prediction using techniques that are generally known in the art.

In various embodiments, training engine 109 monitors the retired predicted block and the subsequent retired predicted block to determine if an instruction stream of processor 100 is currently in a loop and to identify the conditional branch that causes the loop to exit. In some embodiments, a loop is considered, for example, a sequence of instructions that repeat based on certain criteria within computer programs and/or instructions. In some embodiments, a loop is considered, for example, a sequence of instructions that do not repeat based on certain criteria within computer programs and/or instructions but do repeat when only considering a sub-sequence of instructions that belong to a specific call return level (described further below with reference to FIG. 2). Types of loops may be, for example, a for loop or a while loop that repeat a sequence of instructions for a certain number of iterations. The location of the loop exit branch along with information about the number of iterations before exiting the loop is utilized by prediction engine 107 to override the general-purpose conditional predictor that may be located, for example, within prediction engine 107.

After a determination as to whether a loop is occurring at a specific call return level in the instruction stream, training engine 109 identifies loop exit branches located within the loop. Loop exit branches are conditional branches which direction (taken or non-taken) remains the same while staying in the loop and flips when exiting the loop. The loop exit branches are identified in training engine 109 by monitoring the directional behavior of conditional branches located within the loop. Upon identifying a loop exit branch, training engine 109 monitors the loop iteration count to determine a loop iteration count repeat frequency that is used to generate the confidence level associated with the loop exit branch. Based on an evaluation of the confidence level associated with the loop exit branch, the loop size, and the prediction time iteration count, prediction engine 107 generates a branch direction prediction (by combining the output of the loop predictor with a general purpose conditional predictor) that is output by branch predictor 108. Branch predictor 108 is then able to generate branch target addresses to be stored or provided by the one or more BTB tables (also commonly referred to as BT buffers and BTBs) 110. Branch predictor 108 is implemented, at least in part, within instruction fetch unit 106 of a processor (e.g., processor 100 of FIG. 1). While BTB tables 110 are shown internal to branch predictor 108 in FIG. 1, BTB tables 110 may or may not be located in processor 100 proximate to certain elements of instruction fetch unit 106 or branch predictor 108. In some embodiments, processor 100 further includes multiple instruction fetch units 106 and processing pipelines 112.

Figure 2:
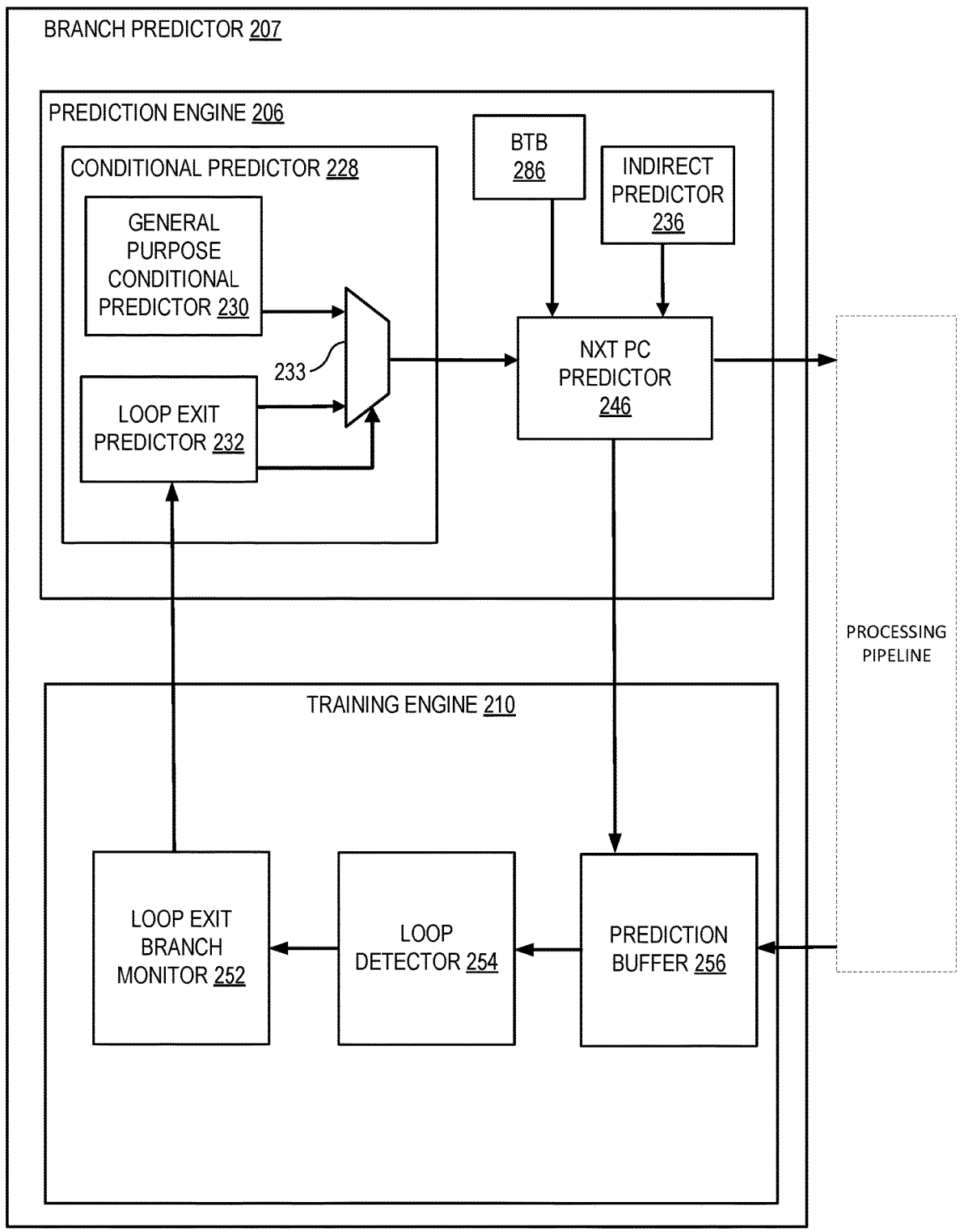
FIG. 2 is a block diagram of the branch predictor of FIG. 1 in accordance with some embodiments.

FIG. 2 is a block diagram of a branch predictor 207 in accordance with some embodiments. Branch predictor 207 includes a prediction engine 206 coupled to a training engine 210. Prediction engine 206 includes a conditional predictor 228, a branch target buffer 286 (BTB 286), an indirect predictor 236, and a next program counter predictor 246 (NXT PC predictor 246). Conditional predictor 228 includes a general purpose conditional predictor 230, a loop exit predictor 232, and a multiplexer 233. Training engine 210 includes a loop exit branch monitor 252, loop detector 254, and a prediction buffer 256. In various embodiments, loop exit predictor 232 may include loop detector 254 and loop exit branch monitor 252. In various embodiments, loop exit predictor 232 is a conditional predictor that is used as a corrector to a tagged geometric length (TAGE) for conditional branches that exit loops after a predictable number of iterations. As described further herein, branch predictor 207 is able to override a general purpose conditional prediction, e.g. TAGE prediction, with loop exit prediction that is a low power, low area design that is not timing critical and minimizes the implementation impact on processor 100 while providing a performance uplift for branch prediction applications.

During operation of branch predictor 207, loop detector 254 of training engine 210 receives a retired predicted block/s and subsequent retired predicted block/s from prediction buffer 256 during retirement time of processor 100. Retirement time refers to the time when the act of committing results of an instruction to the architectural state of the processor occur or have occurred (e.g., results written to a register or the like). A predicted block is a set of predicted instruction bytes, along with information about the branches it contains. The predicted block includes, for example, a start and end address, a descriptor, and a direction of the branches contained in the predicted block. Predicted block information stored in prediction buffer 256 is first created when the block is predicted, and it is then updated on mispredict flushes to keep track of branches belonging to the block even if the branch was not predicted correctly. A retired predicted block is a predicted block that has been retired and the information provided by a retired predicted block reflects the architectural behavior of the branches that have retired. In various embodiments, the retired predicted block and subsequent retired predicted block is used by loop detector 254 to identify whether a loop is occurring in training engine 210.

In various embodiments, prediction buffer 256 tracks information related to branch predictions made by prediction engine 206. The prediction information includes, for example, the prediction address, the target of the prediction, and the history of the prediction. In various embodiments, prediction buffer 256 may be used in the event of a redirect, when it is necessary to flush and recover to restart the prediction, after which prediction buffer 256 is read to recover. Prediction buffer 256 is also used during training to provide retired predicted block/s to loop detector 254. Prior to providing the retired predicted block/s to loop detector 254, prediction buffer 256 receives the predicted block/s from NXT PC predictor 246 and updates on redirects and retires predicted block from processing pipeline 112. A read out of prediction buffer 256 is performed of the retired predicted block/s that were recently retired. The predictors in prediction engine 206, including conditional predictor 228, BTB 286, and indirect predictor 236, are trained using training engine 210, accordingly.

In various embodiments, with regards to the retired predicted block/s provided to loop detector 254, the tag is representative of the fetch address or prediction address of the predictions made by conditional predictor 228. The tag serves as an indicator of the address of the retired predicted block. The descriptor provides a description of the retired predicted block and represents, at the fetch address, the branches that have been predicted by, for example, branch predictor 207. In one embodiment, branch predictor 207 is able to predict up to two branches per cycle and the descriptor describes whether there is a single branch or two branches per cycle and whether each branch is either a conditional or unconditional branch. The direction entry provides the direction associated with the retired predicted block. In various embodiments, for the case of a prediction of two branches, the direction is the direction of the second branch, since a predicted block may contain two branches only if the first branch is predicted as not taken. In various embodiments, the address tag, descriptor, and/or direction of both the retired predicted block/s are used to determine a loop exit prediction provided by loop exit predictor 232 of conditional predictor 228.

In order to generate a loop exit prediction for use as the branch prediction output of branch predictor 207, loop exit predictor 232 relies on loop detector 254, which monitors branches at retire time in order to identify loops. In some embodiments, loop detector 254 works on the non-speculative path and considers loops only at a given call return level. That is, a sequence of instructions that repeat within a call return level may be considered a loop even though the instructions may contain calls and returns between which the sequence of instructions differ from one iteration of the loop to the next. In various embodiments, for example, each thread has a loop detector 254 per call return level. Because loop detector 254 performs loop detection per call return level, i.e., based on a call return level as opposed to the contents of each loop being equivalent, loop detector 254 is able to detect whether a loop has occurred even though the contents of each loop iteration may not be exactly equivalent to other loop iterations. For example, the instruction stream may call a subroutine by performing a call, and then at the end of subroutine, a return is initiated. As a result, when a call is executed, a jump is made into, for example, a higher call return level. When a return is executed, a fall back occurs to a lower call return level. Thus, for a given instruction, such as a program that for every iteration of the loop calls a subroutine, the instruction may be doing something different in the subroutine for every iteration of the loop. However, based on the call return level, loop detector 254 will still detect a loop for the given instruction stream.

For a given call return level, after receiving the retired predicted block, loop detector 254 commences loop detection by taking a snapshot of a state representing the retired predicted block. In various embodiments, a snapshot includes a tag, a descriptor, and a direction of the retired predicted block. In various embodiments, the timing of the snapshot may vary depending on the state of retirement. For example, the snapshot may be taken periodically and/or at random times and/or intervals that are representative of different time factors within the state of retirement. In various embodiments, the identification of a loop occurs at retire time because at retire time the processing elements are non-speculative, i.e., actual program behavior is known, as opposed to prediction time, which is speculative and actual program behavior is not known.

After the snapshot has been taken by loop detector 254, loop detector 254 compares the snapshot of the address to subsequent retired predicted blocks to determine whether there is a match with the snapshot. In one embodiment, loop detector 254 uses comparator logic to compare the snapshot of the address to each retired predicted block in a subsequent stream of retired predicted blocks to determine whether there is a match with the snapshot. When there is a match with the snapshot, a loop has been detected by loop detector 254.

When a loop has been detected by loop detector 254, loop detector 254 observes the loop to identify a conditional branch within the detected loop that exits from the loop, i.e., a loop exit branch. In various embodiments, loop exit branches or loop exit candidates are identified using predetermined conditions. For example, loop exit candidates may be identified when the following conditions are met: (1) the count iteration of the loop being monitored has reached a specified saturation criteria; (2) the direction of one of the two branches mismatches with the expected direction that has been recorded; and/or (3) the predicted block was not redirected for a new branch found. The loop exit branches are stored by loop detector 254 and provided to loop exit branch monitor 252.

Loop exit branch monitor 252 receives the loop exit branches from loop detector 254 and assesses the direction of the loop exit branches. For example, loop exit branch monitor 252 assesses the direction of the loop exit branches as either taken or not taken. Loop exit branch monitor 252 records the number of times a loop exit branch repeats the same direction before switching to an alternate direction. In various embodiments, a switch in the loop exit branches from repeated directions to an alternate direction is an indicator of the number of iterations the loop has undergone prior to exiting the loop (a loop iteration count). The loop iteration count is stored by loop exit branch monitor 252 to determine the number of times the loop iteration count repeats, i.e., a loop iteration count repeat frequency. In one embodiment, loop exit branch monitor 252 monitors the loop iteration count by comparing the current loop iteration count to the preceding loop iteration count to determine the loop iteration count repeat frequency. The loop iteration count repeat frequency is used to ascertain a corresponding confidence level that is assigned by loop exit branch monitor 252.

In various embodiments, the confidence level of the loop exit prediction (loop exit prediction confidence level) provides an indication of the strength of the loop exit prediction and is compared to a confidence threshold to decide whether or not to override the conditional prediction output by general purpose conditional predictor 230 when predicting the direction of the loop exit branch. In one embodiment, the corresponding confidence level may be equivalent to the loop iteration count repeat frequency (the number of loop iteration counts that repeat) and is stored in loop exit branch monitor 252. In various embodiments, an increase and/or decrease in confidence level is dictated by a matching an increase and/or decrease in the loop iteration count repeat frequency. For example, in various embodiments, as the loop gets exited after the same number of iterations multiple times in a row, the confidence level increases. In various embodiments, when loop exit branch monitor 252 determines the loop iteration count no longer repeats, the confidence level refreshes to an initial value of zero. The confidence level is programmable as a threshold to start using the loop exit predictor 232.

Once the confidence level has been ascertained, loop exit predictor 232 determines whether the confidence level surpasses a confidence level threshold. In one embodiment, the confidence level threshold is the threshold at which the loop exit prediction may override the conditional prediction generated by general purpose conditional predictor 230. In various embodiments, the confidence level threshold is set to a value between one and ten, and the confidence levels the loop exit prediction is set to values between one and ten, depending on design preferences. For example, for a confidence level threshold of six, a loop exit prediction confidence value between six and ten triggers loop exit predictor 232, overriding general purpose conditional predictor 230. When the confidence level reaches or surpasses the confidence level threshold, loop exit predictor 232 overrides a conditional prediction provided by general purpose conditional predictor 230. The general purpose conditional predictor 230 is overridden by loop exit predictor 232 using multiplexer 233 to provide the loop exit prediction to NXT PC predictor 246. When the confidence level does not reach or surpass the confidence level threshold, loop exit predictor 232 does not override the conditional prediction provided by general purpose conditional predictor 230. NXT PC predictor 246 then provides a predicted block to prediction buffer 256 and the branch prediction for output by branch predictor 207. Branch predictor 208 provides the predicted address based on either the general purpose conditional prediction or the loop exit prediction output for instruction fetch by the instruction fetch unit of processor 100.

Figure 3:
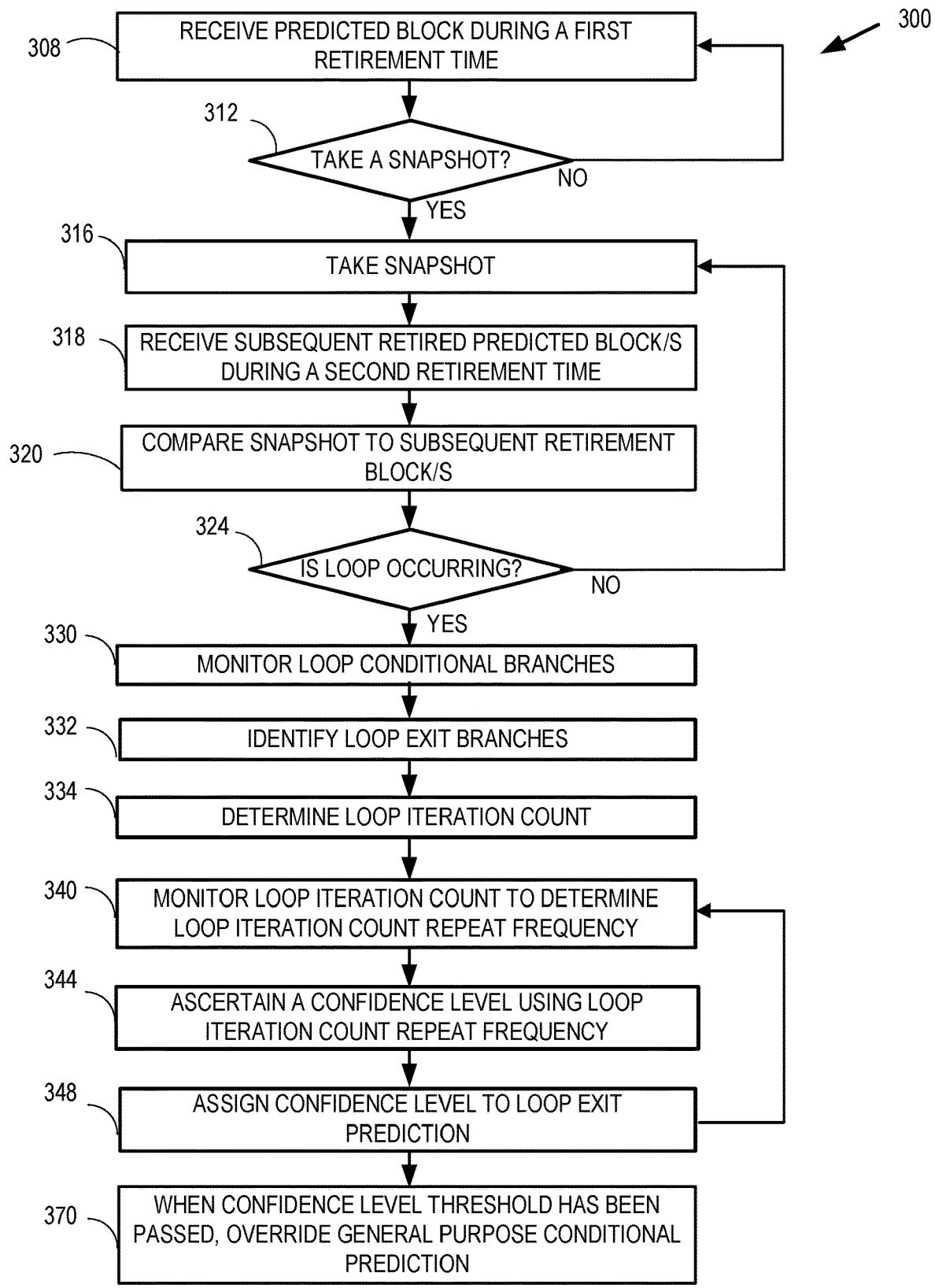
FIG. 3 is a flow diagram of a method for predicting branches in accordance with some embodiments.

FIG. 3 is a flow diagram illustrating a method 300 for predicting branches using loop exit prediction according to various embodiments. The method 300 is implemented in some embodiments of processor 100 shown in FIG. 1 and branch predictor 207 shown in FIG. 2.

In various embodiments, the method flow begins with block 308. At block 308, loop detector 254 receives a predicted block during a first retirement time, i.e., a retired predicted block. At block 312, based on a call return level, loop detector 254 determines whether to take a snapshot of the retired predicted block. When a determination is made to not take a snapshot, method 300 proceeds back to block 308. When a determination is made to take a snapshot, method 300 proceeds to block 316. At block 316, loop detector 254 takes a snapshot of the retired predicted block. In various embodiments, the snapshot includes at least one of an address tag, a descriptor, and a direction. At block 318, loop detector 254 receives a subsequent retired predicted block/s during a second retirement time. In various embodiments, the subsequent retired predicted block/s includes an address tag, a descriptor, and a direction. At block 320, loop detector 254 compares the snapshot of the snapshotted retired predicted block to the subsequent retired predicted block/s. At block 324, loop detector 254 determines if a loop is occurring. In various embodiments, loop detector 254 determines that a loop is occurring when there is a match between all of the tag, descriptor, and direction associated with the snapshot and all of the tag, descriptor, and direction associated with a subsequent retired predicted block/s. When loop detector 254 determines that a loop is not occurring for a set of retired predicted blocks, the method 300 proceeds back to block 316. When loop detector 254 determines that a loop is occurring, method 300 proceeds to block 330.

At block 330, loop detector 254 monitors conditional branches in the loop for use by loop detector 254 to, for example, identify loop exit branches. At block 332, loop detector 254 identifies loop exit branches that exit from the loop. In various embodiments, the direction of all conditional branches is recorded between the first and the second snapshot matches. In subsequent iterations of the loop, the direction of all conditional branches is compared against the direction of all conditional branches that have been previously recorded. In various embodiments, the first branch to change direction is identified as the loop exit branch.

At block 334, loop exit branch monitor 252 monitors the loop exit branches and determines a loop iteration count based on the loop exit branches identified by loop detector 254.

At block 340, loop exit branch monitor 252 monitors the loop iteration count to determine a loop iteration count repeat frequency. At block 344, loop exit branch monitor 252 ascertains a confidence level using the loop iteration count repeat frequency.

At block 348, loop exit predictor 232 assigns a confidence level to the loop exit prediction. In various embodiments, loop exit branch monitor 252 may assign a confidence level to the loop exit prediction. In some embodiments, the confidence level threshold may vary depending on design preferences.

Upon assigning a confidence level in block 348, method 300 proceeds back to block 340 to monitor the next occurrence of the loop, while continuing on to block 370. At block 370, when the confidence level threshold has been passed, loop exit predictor 232 overrides the general purpose conditional prediction using multiplexer 233.

Figure 4:
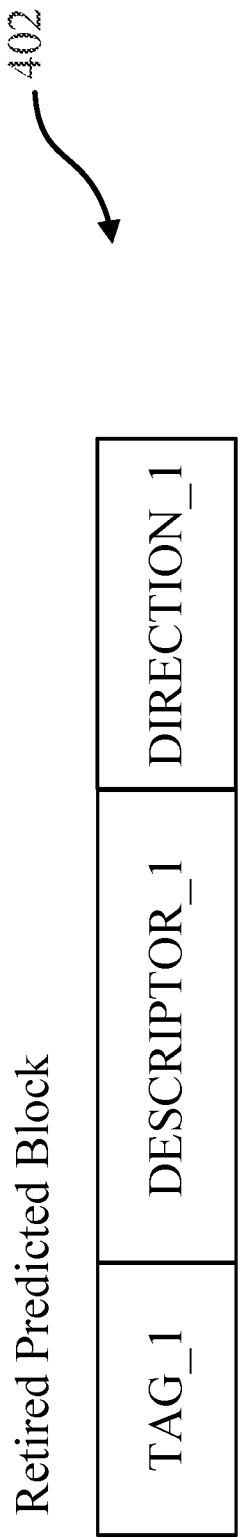
FIG. 4 is a diagram that illustrates an identifier for retired predicted blocks in accordance with some embodiments.

FIG. 4 is a diagram illustrating an identifier 402 for retired predicted blocks in accordance with some embodiments. Identifier 402 includes a tag (TAG_1), a descriptor (DESCRIPTOR_1), and direction (DIRECTION_1). TAG_1 of identifier 402 is representative of the fetch address or the prediction address from which to fetch next instructions for a given predicted block. DESCRIPTOR_1 represents the branches that have been predicted by branch predictor 207 or have been discovered during execution of the instructions contained in the predicted block. As detailed above with reference to FIG. 2, a comparison of the snapshot of identifier 402 with identifiers of subsequent retired predicted block is used by branch predictor 207 to generate a branch prediction using loop exit prediction.

Figure 5:
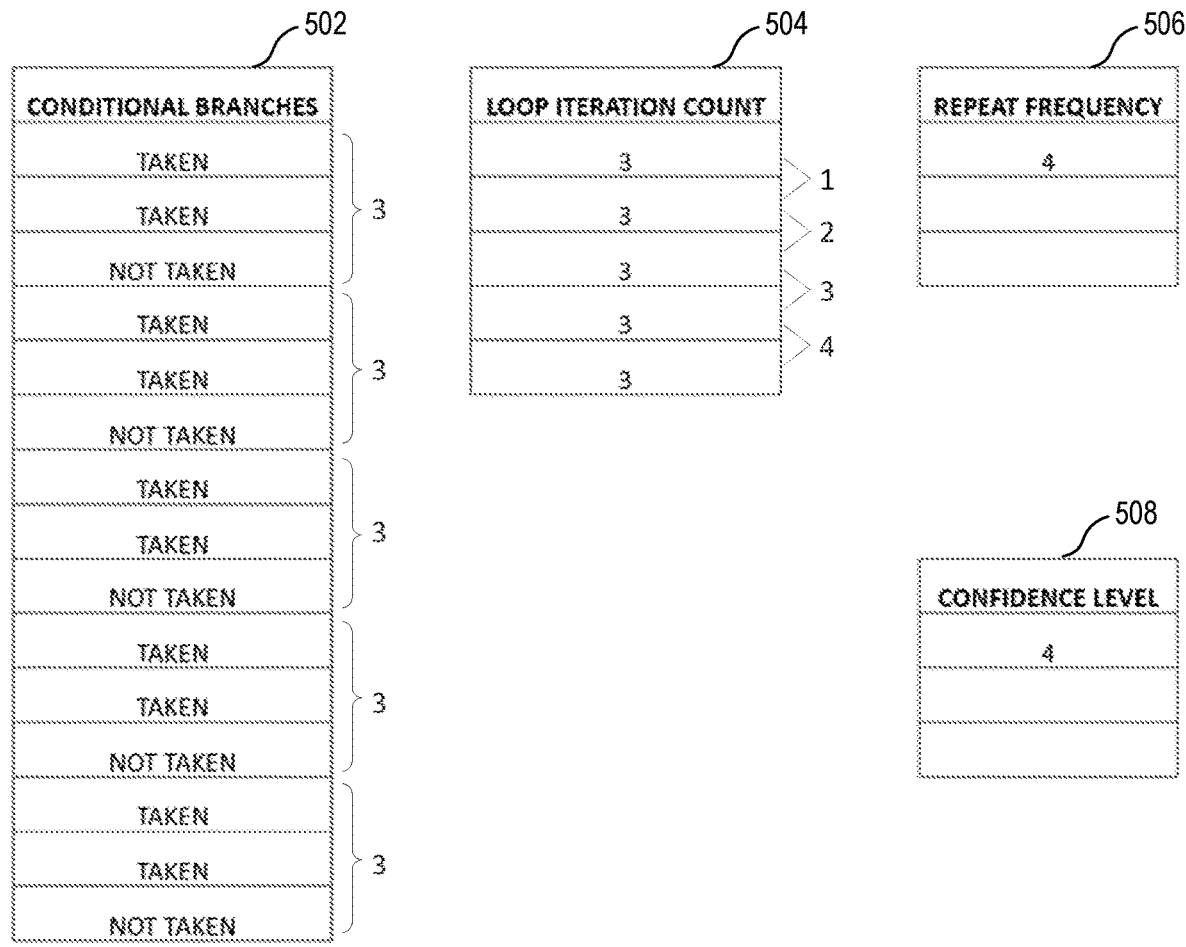
FIG. 5 is a series of tables illustrating an example of attaining a confidence level for loop exit prediction in a processor in accordance with some embodiments.

FIG. 5 is a series of tables illustrating an example of attaining a confidence level for loop exit prediction using a branch predictor in accordance with some embodiments. With reference to FIG. 2, FIG. 5 includes conditional branch table 502, loop iteration count table 504, loop iteration count repeat frequency table 506, and confidence level table 508. In various embodiments, conditional branch table 502 depicts conditional branches that include the loop exit branches that are observed by, for example, loop detector 254. Loop iteration count table 504 depicts the number of loop iterations that have been observed by, for example, loop exit branch monitor 252. For the example provided in FIG. 5, the loop iteration count is three for five sequential instances. Loop iteration count repeat frequency table 506 depicts the number of times the loop iteration count has repeated as observed by, for example, loop exit branch monitor 252. For the example provided, the loop iteration count repeat frequency is four. Confidence level table 508 depicts the confidence level assigned by loop exit branch monitor 252 for the given loop iteration count frequency. For the example provided, the confidence level assigned by loop exit branch monitor 252 for use by loop exit predictor 232 is four. With a confidence level threshold of, for example, two, the loop exit predictor 232 would override general purpose conditional predictor 230 and provide the associated loop exit prediction to branch predictor 207 for branch prediction.

In some embodiments, the apparatus and techniques described above are implemented in a system including one or more integrated circuit (IC) devices (also referred to as integrated circuit packages or microchips), such as the processors described above. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   assigning a confidence level to a loop exit prediction generated by a loop exit predictor, the confidence level indicating a confidence that a loop will exit; and
   overriding a general purpose conditional prediction of a general purpose conditional predictor based on said confidence level exceeding a confidence level threshold.

2. The method of claim 1, further comprising:
   generating said confidence level by determining a loop iteration count based on loop exit branches identified in a loop determined by a loop detector.

3. The method of claim 2, further comprising:
   monitoring said loop iteration count to determine a loop iteration count repeat frequency to generate said confidence level.

4. The method of claim 3, further comprising:
   determining whether said loop is occurring using a snapshot of a retired predicted block and a subsequent retired predicted block during a retirement time.

5. The method of claim 4, wherein said snapshot includes an address tag, a descriptor, and a direction of said retired predicted block.

6. The method of claim 5, wherein said subsequent retired predicted block includes an address tag, a descriptor, and a direction of said subsequent retired predicted block.

7. The method of claim 1, wherein a multiplexer is used for overriding said general purpose conditional prediction.

8. The method of claim 4, wherein said snapshot is taken periodically.

9. A processor, comprising:
   a prediction engine including a loop exit predictor; and
   a training engine coupled to said prediction engine, said training engine including a loop exit branch monitor coupled to a loop detector,
   wherein:
      based on at least one of a plurality of call return levels, said loop detector of said processor takes a snapshot of a retired predicted block during a first retirement time, compares said snapshot to a subsequent retired predicted block at a second retirement time, and based on said comparison,
      identifies a loop and loop exit branches within said loop for use by said loop exit branch monitor and said loop exit predictor to determine whether to override a general purpose conditional prediction.

10. The processor of claim 9, wherein said loop exit branch monitor determines a loop iteration count based on said loop exit branches.

11. The processor of claim 10, wherein said loop exit branch monitor monitors said loop iteration count to determine a loop iteration count repeat frequency.

12. The processor of claim 11, wherein said loop exit predictor uses said loop iteration count repeat frequency to generate a loop exit prediction confidence level.

13. The processor of claim 12, wherein said loop exit prediction confidence level is used to override said general purpose conditional prediction.

14. The processor of claim 9, wherein said snapshot includes an address tag, a descriptor, and a direction of said retired predicted block.

15. The processor of claim 9, further comprising a processing pipeline coupled to said training engine to provide said retired predicted block and said subsequent retired predicted block to said training engine.

16. The processor of claim 9, wherein said plurality of call return levels is limited to four and each call return level in said plurality of call return levels includes at least one said loop detector.

17. The processor of claim 9, further comprising:
a multiplexer coupled to said loop exit predictor; and
a general purpose conditional predictor coupled to said multiplexer, wherein said multiplexer is triggered by said loop exit predictor to override said general purpose conditional predictor when a determination is made by said loop exit predictor to override said general purpose conditional prediction.

18. A method comprising:
based on a call return level, taking a snapshot of a retired predicted block during a first retirement time;
comparing said snapshot of said retired predicted block to a subsequent retired predicted block to determine when a loop is occurring;
when said loop is occurring, identifying loop exit branches in said loop which exit from said loop;
determining a loop iteration count based on said loop exit branches;
monitoring said loop iteration count to determine a loop iteration count repeat frequency; and
overriding a general purpose conditional prediction based on said monitoring of said loop iteration count.

19. The method of claim 18, further comprising:
using said loop iteration count repeat frequency to ascertain a loop exit prediction confidence level.

20. The method of claim 19, wherein overriding said general purpose conditional prediction occurs when said loop exit prediction confidence level passes a confidence level threshold.

\* \* \* \* \*